Patented May 21, 1946

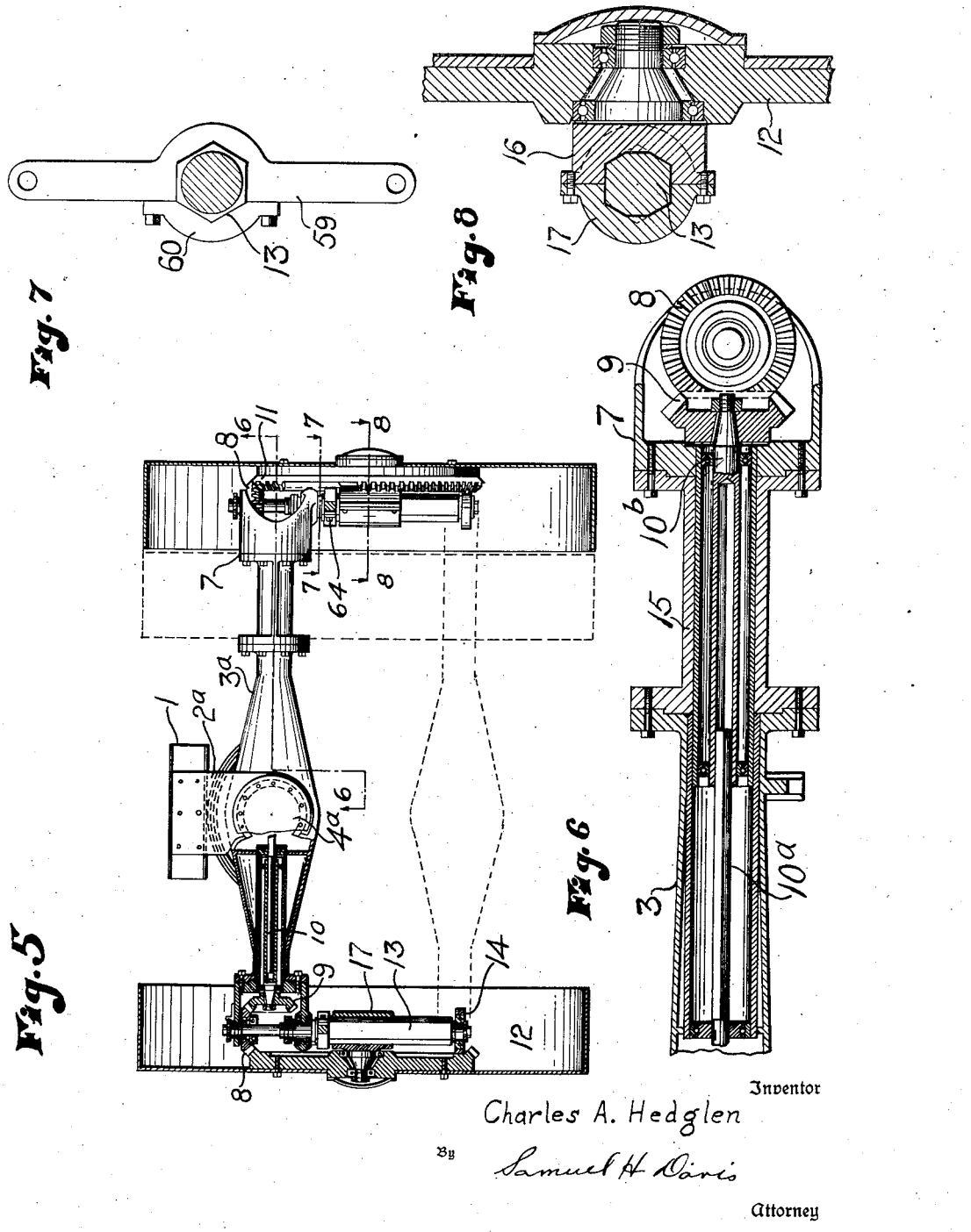

2,400,505

UNITED STATES PATENT OFFICE 2,400,505

TRACTOR

Charles A. Hedglen, Lansing, Mich., assignor, by decree of distribution, to Isabella Hedglen Application August 14, 1943, Serial No. 498,671

2 Claims. (Cl. 180—46)

This invention relates to motor driven tractor mechanisms, and has for its object the provision of parts and devices of special construction and arrangement whereby the front and rear wheels may be turned for the purpose of steering the machine, the wheels being turned simultaneously or the front wheels and rear wheels arranged independently. It is a further object of this invention to provide means whereby the axles of the wheels may be extended to change the distance between the wheels on the same axle. An additional object of this invention is the introduction of particular mechanism for the raising or lowering the frame of the tractor and for securing the same in position, whereby the center of gravity of the whole is brought into a very low point, to prevent overturning on an inclined hillside or like situation.

The construction of the various parts of this invention and the arrangement thereof are illustrated in the accompanying drawings, of which Fig. 1 represents a side view with the near wheels removed.

Fig. 5 is a vertical cross section of the wheels at the rear of the frame, showing also in broken lines the low position in which the frame may be arranged.

Fig. 6 is a somewhat enlarged section lengthwise of the extensible portion of one of the axles. This sectional view is taken on the line 6—6 of Fig. 5.

Fig. 7 is a top view of a modified king pin member. This view is a sectional illustration, the section being taken on the line 7—7 of Fig. 5.

Fig. 8 is a sectional view, somewhat enlarged, of the wheel carrying spindle and devices of one of the axles. This sectional view is taken on the line 8—8 of Fig. 5.

Throughout the drawings and description the same number is used to refer to the same part.

Figure 1:
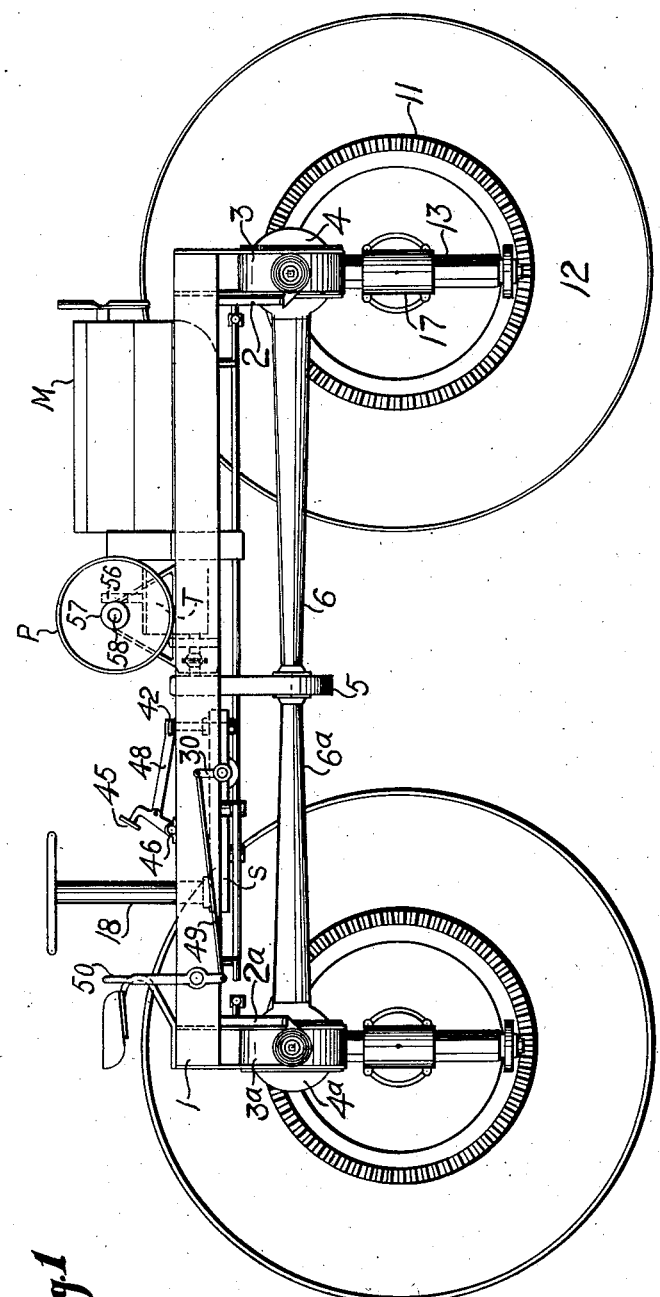

Considering the drawings, the frame 1 has the front and rear axle supporting plates 2 and 2a, the axle housings 3 and 3a carried by the plates, and the differentials of customary construction 4 and 4a for the axles. A motor M has its shaft connected by suitable reduction gearing in the housing 5 with a driving shaft or shafts extending thence in shaft housings 6 and 6a into driving engagement with the differential gearing in the housings 4 and 4a. Those parts are of ordinary formation and disposition and constitute no part of this invention.

As shown in Figs. 5 and 6, gear housings 7 terminate the axle housings, or extensions thereof, and within each housing is a mitre gear 8 engaging a like gear 9 on axle 10. Gear 8 is thus driven by the axle, and it also engages a gear ring 11 on wheel 12. Wheels 12 are arranged in pairs in the usual manner at the front and rear of the frame and each wheel is provided with operating means including the king pins 13 usually of hexagonal cross section as illustrated in Fig. 7. Gear 8 mentioned is the upper gear or pinion carried by the king pin 13, and that gear with a lower bearing 14 on the lower end of the king pin engage the gear ring 11 on the wheel. This is to keep the gear 8 in the correct meshing arrangement with the ring.

As shown in Fig. 6, on one side of the tractor the axle 10a is squared in cross section and engages an extensible and spindle carrying portion 10b to which the gear 9 is attached. The added portion 15 of the axle housing 3 is constructed of such length as to permit the desired distance between the wheels to be arranged.

Considering Figs. 5 and 6, the wheel spindle 16 is held to the king pin 13 by the removable clamp 17.

Figure 2:
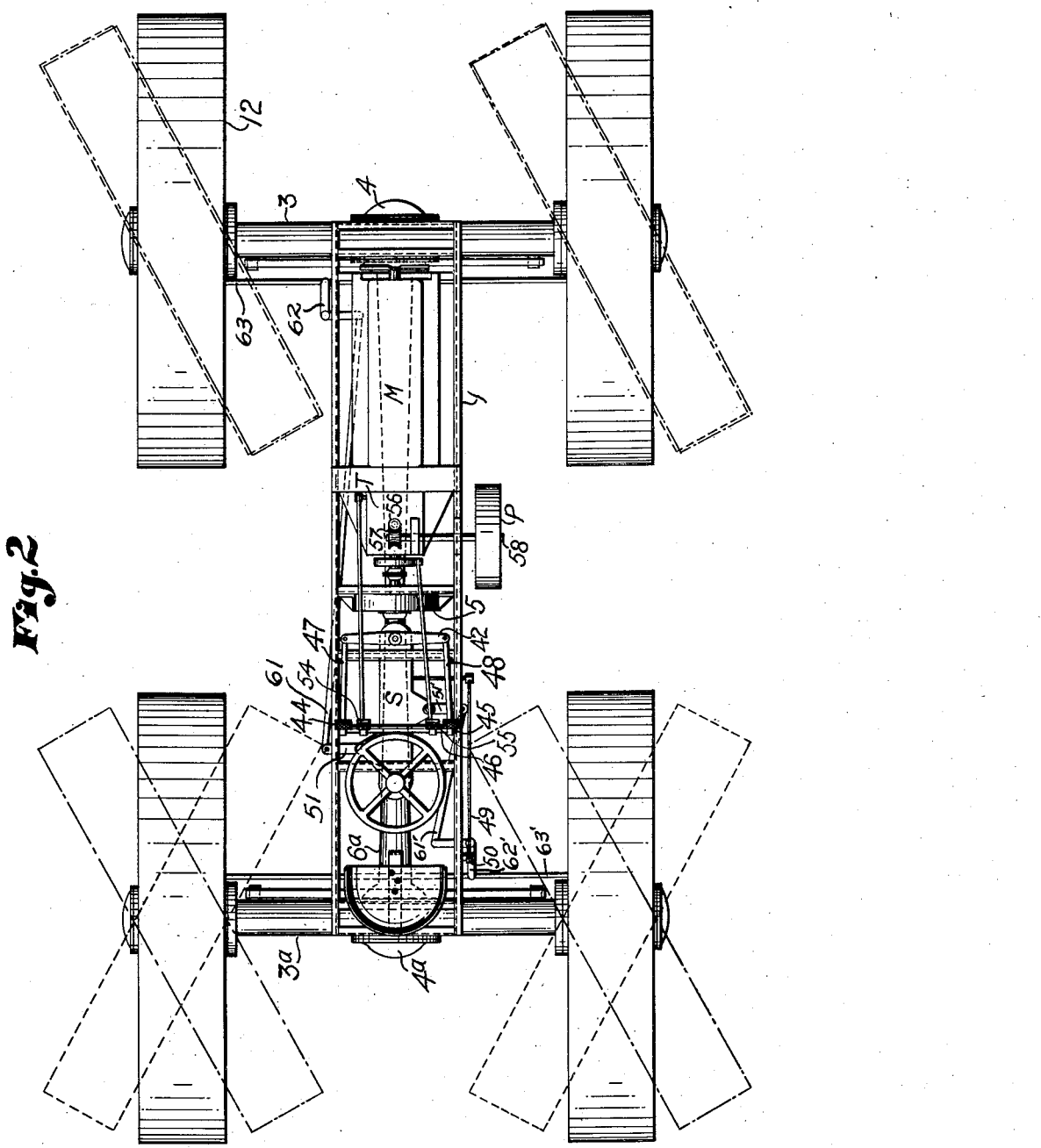
Fig. 2 is a top view, with the different positions of the wheels indicated in broken lines.
Figure 3:
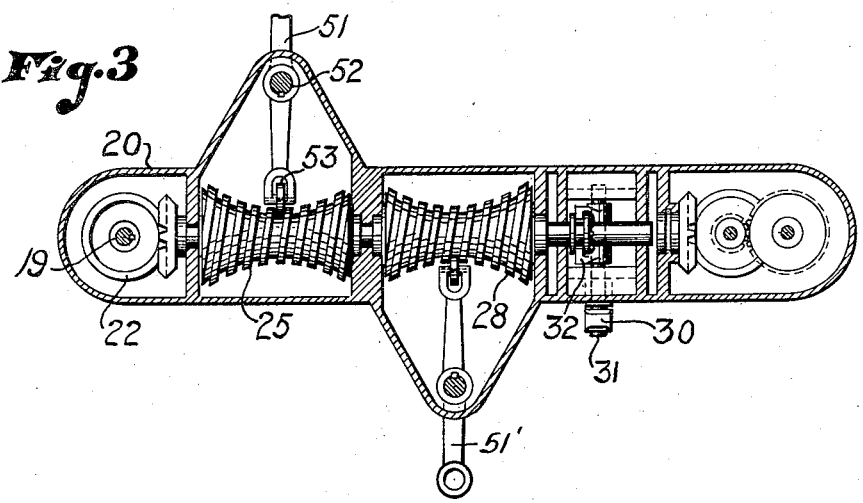
Fig. 3 is a horizontal section through the worm wheels housing.
Figure 4:
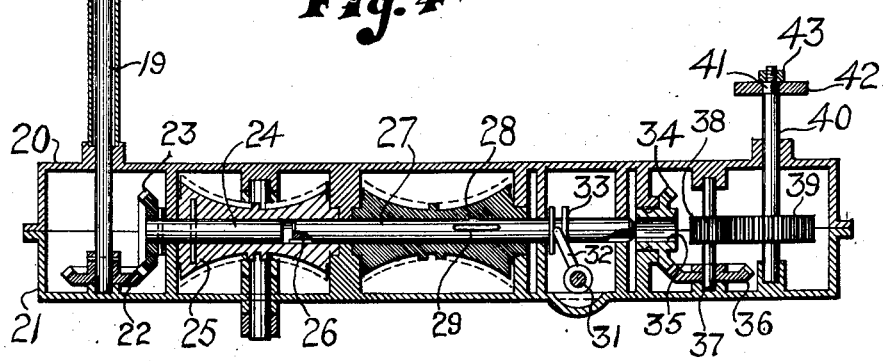
Fig. 4 is a vertical sectional view through the worm wheels housing.

Considering Figs. 1 and 4 the vertical tube 18 contains the steering rod 19 at the top of which is the usual steering wheel as illustrated. Tube 18 rises from the upper portion 20 of the worm wheel housing, the lower half or portion being 21. At the lower end of the steering rod 19 in housing 21 is a gear 22 engaging gear 23 on the end of the short shaft 24 that passes axially through the double conical worm wheel or cylinder 25. Worm wheel 25 is rotated by the steering devices, and in Figs. 1 and 2 those devices as a whole are designated by the letter S. Extending part way into the worm wheel 25, and having a key seat in its end to engage the key 26, is a shaft 27 that carries a second double conical worm wheel 28 movably engaging the shaft 27 by means of a key 29, or in any equivalent way. A crank arm 30, Fig. 1, is arranged to turn the shaft 31, Fig. 4, and by means of the yoke 32 and grooved collar 33 the shaft 27 may be longitudinally reciprocated. If the yoke 32 with the collar 33 were thrown to the right hand from the position in Fig. 4, the mitre gear 34 by means of the key 35 would become engaged by the shaft 27, and such engagement would continue by way of mitre gear 36 on the short shaft 37, pinion 38 on shaft 37, gear 39 to shaft 40 having the squared end 41 carrying the transverse lever 42 best shown in Fig. 2. The lever is held in place by the top nut 43 on shaft 40. In Fig. 2 it will be noted that the pedals 44 and 45 on cross shaft 46 connect pivotally with the link rods 47 and 48, and by the continuous engagement of the parts just stated a partial rotation can be given shaft 27 and worm wheel 28. That movement would be independent of the operation of the steering devices. To operate the crank arm 39, as best shown in Fig. 1, a connecting rod 49 extends to a hand lever 50 mounted near the seat of the driver of the tractor. The double conical worm wheels are included in the mechanical means for turning the wheels in the planes of the wheels, and the connections are the same as those illustrated in Fig. 3 coacting with the worm wheel 25. A lever 51 has a fulcrum 52 on the housing, and the inner end of the lever carries the roller disk 53 engaging the worm wheel. Rotation of the worm wheel moves the lever in either direction desired. The lower lever 51' shown in Fig. 3 engaging worm gear 28 is the same as lever 51 in construction and operation.

In Fig. 2 are shown a clutch pedal 54 and a brake pedal 55 both pivotally carried by the cross shaft 46 and connected in any suitable manner with the clutch and brake contrivances of the machine. In this Fig. 2 is also set out, and likewise shown in Fig. 1, a worm gear 56 rising out of a transmission T about midway of the frame, and engaging a worm wheel 57 which is secured to a transverse shaft 58 that carries a pulley P, by means of which power take off is obtained from the motor M for driving adjacently placed circular saws, threshing machines or such associated machinery.

The necessity for the modified lever 59 illustrated in Fig. 7 and clamped to the king pin 13 by the clamping member 60, will be explained in connection with the statement of the operation of this invention.

Again considering Fig. 2, it will be noted that the lever 51 described previously and shown in Fig. 3, is pivotally joined with a draw rod 61 by which the bell crank 62 is turned and the cross rod 63 operated to turn the crank arm 64 on the king pin 13 and thereby turn the wheel upon a vertical diameter.

In the operation of this invention, the rotation of the steering wheel turns the worm wheel 25 and by reason of the connections hereinabove explained the front wheels may be correspondingly turned on their pivots in the planes of the wheels. If the shaft 27 is moved into key engagement with the worm wheel 25, the second worm wheel 28 is rotated by the steering devices and the rear wheels turned simultaneously but in a direction contrary to the movement of the front wheels by lever 51' through steering connections 61', 62' and 63'. The tractor will thus make a relatively short turn. If, however, the shaft of the second worm wheel 28 be moved lengthwise by the operation of lever 50, and the pedals 44 and 45 are employed to give the worm wheel a partial rotation, the rear wheels may be independently of the steering gear caused to take up an inclined position as indicated in broken lines in Fig. 2.

In Fig. 5 the chassis of the tractor is represented in a raised position. By removing the bolts holding the axle housing to the gear housing 7, the frame 1 and axles may be lowered into the position indicated by the broken lines. The bolts are then replaced. The center of gravity of the whole is very much lower, and tilting due to slant in the surface travel is materially reduced. It will be noted that in assuming the low position the king pins are inverted. Therefore, the end of the crank arm 64 for turning the king pins must extend in the opposite direction. For this purpose the two-way extending crank arm 59 illustrated in Fig. 7 is provided instead of crank arm 64.

It is thought that the stated objects of turning the wheels in the wheel planes front and rear independently or in unison, the extension of the width of the wheel base, and the adjustment of the frame in its higher or lower positions has been made clear by the foregoing explanation.

Having now described this invention, I claim:

1. In a tractor mechanism, a frame, front and rear pairs of wheels and axles, a motor, a motor shaft, each wheel having a gear ring thereon arranged concentrically therewith, a spindle engaging the center of the wheel whereon the wheel revolves, a rotative king pin on each wheel and arranged diametrically on the wheel, said king pins passing through the said spindle devices, each king pin having an upper pinion and a lower bearing engaging the ring on its wheel, driving connections between said motor shaft and axles, driving connections between said axles and said upper pinions, a steering wheel, a steering rod having a gear wheel at the lower end thereof, a gear wheel meshing with the said gear and having a shaft, a double conical worm wheel, said gear shaft extending into the worm wheel and engaging the same whereby the rotation of the steering wheel will rotate said worm wheel, a lever having an end roller disk engaging the worm wheel and a pivoted fulcrum, the said front wheels of the tractor having crank arms and operative connections with the said lever engaging the worm wheel whereby a movement of the worm wheel lever by the steering wheel turns the front wheels into different vertical planes.

2. In a tractor mechanism, a frame, front and rear pairs of wheels and axles, a motor, a motor shaft, each wheel having a gear ring thereon arranged concentrically therewith, a spindle engaging the center of the wheel whereon the wheel revolves, a rotative king pin on each wheel and arranged diametrically on the wheel, said king pins passing through the said spindle devices, each king pin having an upper pinion and a lower bearing engaging the ring on its wheel, driving connections between said motor shaft and axles, driving connections between said axles and said upper pinions, a steering wheel, a steering rod having a gear wheel at the lower end thereof, a gear wheel meshing with the said gear and having a shaft, a double conical worm wheel, said gear shaft extending into the worm wheel and engaging the same whereby the rotation of the steering wheel will rotate said worm wheel, a lever having an end roller disk engaging the worm wheel and a pivoted fulcrum, the said front wheels of the tractor having crank arms and operative connections with the said lever engaging the worm wheel whereby a movement of the worm wheel lever by the steering wheel turns the front wheels into different vertical positions, a second worm wheel having a shaft movable lengthwise and whereby both worm wheels may be coupled together, said second worm wheel having a lever and pivotal connecting rods as described arranged to act upon said rear wheels, and hand operated lever and crank arm connections whereby the shaft of said second worm wheel may be lengthwise moved in either direction.

CHARLES A. HEDGLEN.